US012704190B2

(12) United States Patent
Cao

(10) Patent No.: US 12,704,190 B2
(45) Date of Patent: Aug. 11, 2026

(54) PRESSURE RELIEF VALVES FOR LIQUID HYDROGEN TANKS

(71) Applicant: Engineered Controls International, LLC, Elon, NC (US)

(72) Inventor: Guangbin Cao, Shanghai (CN)

(73) Assignee: Engineered Controls International, LLC, Elon, NC (US)

( * ) Notice: Subject to any disclaimer, the term of this patent is extended or adjusted under 35 U.S.C. 154(b) by 352 days.

(21) Appl. No.: 18/686,258

(22) PCT Filed: Aug. 26, 2021

(86) PCT No.: PCT/CN2021/114819
§ 371 (c)(1),
(2) Date: Feb. 23, 2024

(87) PCT Pub. No.: WO2023/024033
PCT Pub. Date: Mar. 2, 2023

(65) Prior Publication Data
US 2026/0160350 A1 Jun. 11, 2026

(51) Int. Cl.
*F16K 17/04* (2006.01)
*F16K 17/06* (2006.01)
*F17C 13/04* (2006.01)

(52) U.S. Cl.
CPC .......... *F16K 17/0413* (2013.01); *F16K 17/06* (2013.01); *F17C 13/04* (2013.01);
(Continued)

(58) Field of Classification Search
CPC ...... F16K 17/0413; F16K 17/06; F17C 13/04; F17C 2205/0332; F17C 2221/012; F17C 2223/013
(Continued)

(56) References Cited

U.S. PATENT DOCUMENTS 1,686,875 A * 10/1928 Nelson .................... F16K 17/10 137/553
2,005,931 A 6/1935 Buttner
(Continued)

FOREIGN PATENT DOCUMENTS

CN 102359600 2/2012
CN 203823171 9/2014
(Continued)

OTHER PUBLICATIONS

Extended European Search Report for European Patent Application No. 21954562.1 dated Mar. 21, 2025, 7 pp.
(Continued)

*Primary Examiner* — Minh Q Le
(74) *Attorney, Agent, or Firm* — Neal, Gerber & Eisenberg LLP

(57) ABSTRACT

Pressure relief valves for liquid hydrogen tanks are disclosed. An example pressure relief valve includes a valve body defining a chamber. A seat body defines a valve seat positioned within the chamber. A valve disc includes a flange and defines a sealing surface. The valve disc is configured to engage the valve seat in a closed position. A guide includes a first guide end and a second guide end. The first guide end defines a recessed surface that securely receives the flange of the valve disc. A retainer is coupled to the guide and defines an inner ledge. The flange of the valve disc is secured between the inner ledge and the first guide end. A cap is coupled to the valve body within the chamber. A spring extends between and engages the cap and the second guide end to bias the valve disc to the closed position.

20 Claims, 15 Drawing Sheets

(52) U.S. Cl.
CPC ................. *F17C 2205/0332* (2013.01); *F17C 2221/012* (2013.01); *F17C 2223/013* (2013.01)

(58) Field of Classification Search
USPC ............ 137/535, 315.33, 511; 251/159, 172, 251/320, 337
See application file for complete search history.

(56) References Cited

U.S. PATENT DOCUMENTS

| | | | | |
|---|---|---|---|---|
| 3,425,444 A | 2/1969 | Jones | | |
| 4,432,389 A * | 2/1984 | Jackson | F16K 17/0413 | 137/543.13 |
| 5,188,017 A * | 2/1993 | Grant | F17C 13/04 | 251/129.21 |
| 5,341,838 A | 8/1994 | Powell | | |
| 9,435,448 B2 * | 9/2016 | Matsuo | F16K 17/065 | |
| 10,125,881 B2 * | 11/2018 | Choate | F16K 17/0413 | |
| 11,773,995 B1 * | 10/2023 | Jassim | F16K 17/0413 | 137/535 |
| 2003/0047216 A1 | 3/2003 | Kelly | | |
| 2010/0006159 A1 * | 1/2010 | Lin | F16K 15/063 | 137/489.5 |
| 2012/0273220 A1 * | 11/2012 | Ezekiel | E21B 41/0021 | 137/542 |
| 2015/0184805 A1 * | 7/2015 | Lee | F17C 13/04 | 137/861 |
| 2016/0084394 A1 * | 3/2016 | Wyatt | F17C 13/04 | 220/203.27 |
| 2022/0290769 A1 * | 9/2022 | Chi | F16K 17/383 | |
| 2023/0349477 A1 * | 11/2023 | Cao | F16K 17/0466 | |

FOREIGN PATENT DOCUMENTS

| | | |
|---|---|---|
| CN | 105465437 | 4/2016 |
| GB | 1250055 | 10/1971 |
| KR | 200310661 | 4/2003 |
| KR | 101793239 | 12/2017 |
| WO | WO2021035625 | 3/2021 |

OTHER PUBLICATIONS

International Search Report and Written Opinion for PCT/CN2021/114819 dated May 7, 2022, 9 pp.

* cited by examiner

PRESSURE RELIEF VALVES FOR LIQUID HYDROGEN TANKS

CROSS-REFERENCE

This application is a national stage entry of International Patent Application No. PCT/CN2021/114819 filed on Aug. 26, 2021, which is incorporated herein by reference in its entirety.

TECHNICAL FIELD

This disclosure generally relates to liquid hydrogen tanks and, more particularly, to pressure relief valves for liquid hydrogen tanks.

BACKGROUND

Liquid hydrogen has been used as fuel for a machine, such as a vehicle. Oftentimes, liquid hydrogen is initially stored in a storage tank. The liquid hydrogen is then transferred from the storage tank to another storage tank of a machine, via specialized hose(s), nozzle(s), and/or receptacle(s), where it is subsequently uses as fuel for the machine.

Such storage tanks typically store the hydrogen at cryogenic temperatures to keep a portion of the hydrogen in its liquid phase. Another portion of the stored hydrogen is typically in its gaseous phase. That is, storage tanks that store hydrogen at cryogenic temperatures simultaneously contain both liquid hydrogen and gaseous hydrogen. Due to the difference in weight, the liquid hydrogen sinks to the bottom portion of the storage tank and the gaseous hydrogen rises to the top portion of the storage tank.

Hydrogen stored within a storage tank may expand when warmed, for example, due to increased environmental temperatures. The expansion of the hydrogen within the storage tank may result in an increased pressure within storage tank. Some known storage tanks incorporate a pressure relief valve that releases some of the gaseous hydrogen from the storage tank when the pressure within the storage tank reaches a certain level. However, some known pressure relief valves may release the gaseous hydrogen too slowly and/or not return to a fully closed state over time.

SUMMARY

An example pressure relief valve for a liquid hydrogen tank comprises a valve body defining a chamber extending between a first end and a second end. The pressure relief valve also comprises a seat body coupled to the first end of the valve body and defining a valve seat that extends into and is positioned within the chamber of the valve body. The pressure relief valve also comprises a valve disc that comprises a flange and defines a sealing surface. The valve disc is positioned within the chamber of the valve body. The valve disc is configured to engage the valve seat in a closed position and is configured to disengage the valve seat in an open position. The pressure relief valve also comprises a guide disposed within the chamber. The guide includes a first guide end and a second guide end. The first guide end defines a recessed surface that securely receives the flange of the valve disc. The pressure relief valve also comprises a retainer coupled to the guide within the chamber. The retainer defines an inner ledge. The flange of the valve disc is secured between the inner ledge and the first guide end. The pressure relief valve also comprises a cap coupled to the valve body within the chamber adjacent the second end of the valve body. The pressure relief valve also comprises a spring extending between and engaging the cap and the second guide end to bias the valve disc to engage the valve seat in the closed position.

In some examples, outer surfaces of the guide and the retainer and an inner surface of the valve body define flow paths through which fluid flows within the chamber. In some such examples, the inner surface of the valve body has a cylindrical shape and the outer surfaces of the guide and the retainer form a substantially polygonal shape to define the flow paths. In some such examples, the outer surfaces of the guide and the retainer have rounded portions that engage the inner surface of the valve body. Further, in some such examples, the rounded portions of the guide are spaced apart axially from the rounded portions of the retainer to create multiple contact points axially along a longitudinal axis of the valve body to deter the valve disc from tilting relative to the longitudinal axis within the chamber.

In some examples, the valve disc is formed of polychlorotrifluoroethylene to withstand temperatures of liquid hydrogen.

In some examples, the guide includes a rib that extends from the recessed surface. The rib grips the flange of the valve disc to facilitate retainment of the valve disc within the recessed surface.

In some examples, the guide includes an outer lip that extends circumferentially around the recessed surface. The outer lip engages an outer circumferential surface of the flange to facilitate alignment of the valve disc with the valve seat.

In some examples, the valve disc defines a through hole. The through hole enables a back pressure to keep the flange coupled to the recessed surface when the valve disc is moved to the open position.

In some examples, the valve disc is a solid block to facilitate the valve disc in remaining secured to the recessed surface as the valve disc is moved to the open position.

In some examples, the cap includes a core and a plurality of arms that extend radially outward from the core. The plurality of arms are circumferentially spaced apart from each other to define openings for fluid flow. In some such examples, the plurality of arms of the cap include external threads and the valve body includes internal threads adjacent the second end that threadably couple the cap to the valve body. In some such examples, a position of the cap relative to the valve body is adjustable via threads to enable a biasing force of the spring to be adjusted.

In some examples, the guide includes an inlet-side portion that defines the recessed surface and external threads. The retainer defines a recessed chamber with internal threads (646). The internal threads threadably receive the external threads to couple the retainer to the guide.

In some examples, the seat body includes external threads and the valve body includes internal threads adjacent the first end that threadably couple the seat body to the first end of the valve body.

DETAILED DESCRIPTION OF THE DRAWINGS

Figure 1:
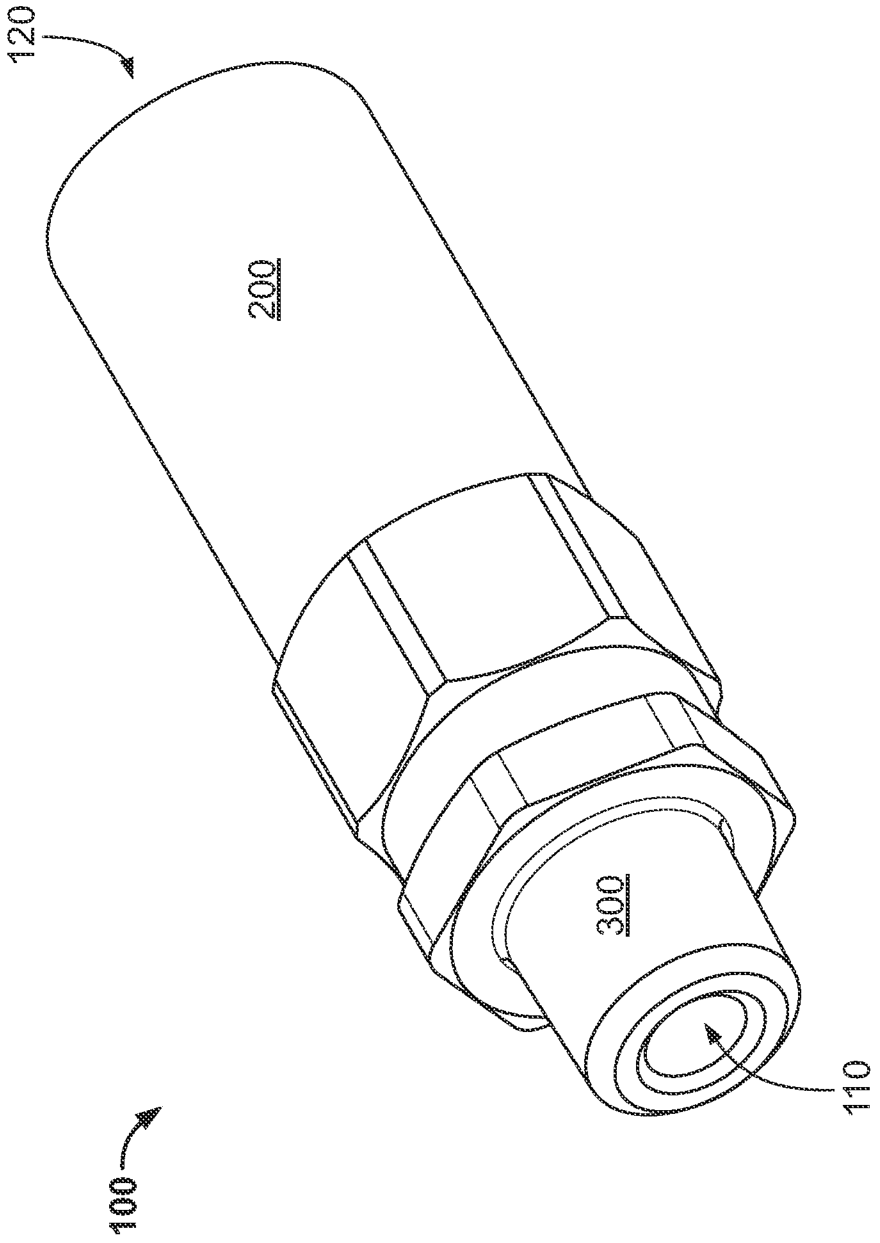
FIG. 1 is a perspective view of an example pressure relief valve for a liquid hydrogen tank in accordance with the teachings herein.
Figure 2:
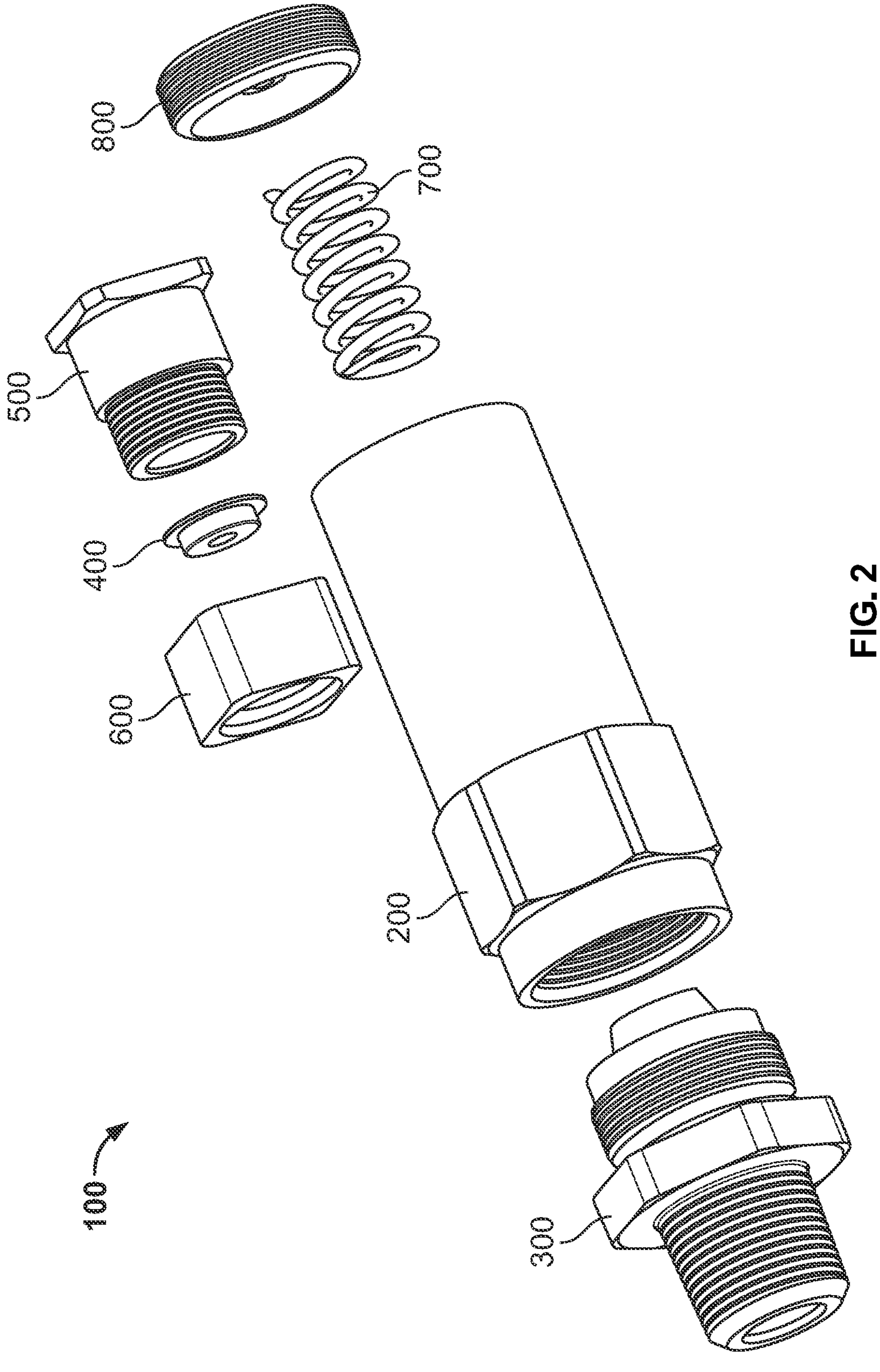
FIG. 2 is an exploded perspective view of the pressure relief valve of FIG. 1.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The present specification is intended to be taken as a whole and interpreted in accordance with the principles of the present invention as taught herein and understood by one of ordinary skill in the art.

The scope of the present invention is intended to cover all such embodiments that may fall within the scope of the appended claims, either literally or under the doctrine of equivalents. The specification describes exemplary embodiments which are not intended to limit the claims or the claimed inventions. Features described in the specification, but not recited in the claims, are not intended to limit the claims.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Some features may be described using relative terms such as top, bottom, vertical, rightward, leftward, etc. It should be appreciated that such relative terms are only for reference with respect to the appended drawings. These relative terms are not meant to limit the disclosed embodiments.

Pressure relief valves disclosed herein are configured to release pressure that has built up within a storage tank of fluid material. For example, a storage tank for liquid hydrogen contains hydrogen in both liquid form and gas form, with the gaseous hydrogen being located above the liquid hydrogen. The pressure relief valve is configured to be installed in a gas-phase position of the storage tank. Typically, the storage tank has a predefined maximum operating pressure (e.g., 1.0 MPa). The pressure relief valve is configured to a have a release pressure (e.g., 1.1 MPa) that is greater than the predefined maximum operating pressure of the storage tank. When the pressure within the storage tank exceeds the release pressure of the pressure relief valve, the pressure relief valve is configured to open so that pressure within the storage tank may be released until the pressure within the storage tank is below the maximum operating pressure of the storage tank.

Pressure relief valves disclosed herein are configured to (1) quickly release gaseous hydrogen from a liquid hydrogen storage tank to quickly reduce a pressure built up within the storage tank and (2) subsequently return to a fully closed state to prevent hydrogen from unintentionally leaking over time. Pressure relief valves disclosed herein include a valve disc, a guide, and a retainer disposed within a body of a pressure relief valve. The valve body defines a chamber in which other components are positioned. The seat body is coupled to a first end of the valve body and defines a valve seat. The valve disc includes a flange and defines a sealing surface that is configured to engage the valve seat in a closed position. The guide includes a first end and an opposing second end. The first end defines a recessed surface that securely receives the flange of the valve disc. The retainer is coupled to the guide within the chamber and defines an inner ledge. The flange of the valve disc is secured between the inner ledge and the first guide end. The cap is coupled to the valve body within the chamber. The spring extends between and engages the cap and the second end of the retainer to bias the valve disc toward the closed position at which the valve disc sealingly engages the valve seat.

Pressure relief valves disclosed herein are configured to be used in liquid hydrogen applications. In turn, the valve disc of examples disclosed herein is composed of a relatively hard material, such as polychlorotrifluoroethylene or other plastic material, to withstand the extremely cold temperatures of liquid hydrogen. The valve body, the valve disc, the guide, and the retainer are configured to ensure that the valve disc formed of the hard material is able to consistently form a sealed connection with the valve seat in a closed position.

Example pressure relief valves include features that enable such a hard material of the valve disc to consistently and repeatedly form a sealed connection with the valve seat. In one embodiment, the guide and the retainer create multiple contact points axially along a longitudinal axis of the valve body to deter the valve disc from tilting within the chamber. In another embodiment, the guide and the retainer include small rounded surfaces that contact valve body within the chamber to reduce friction between those components as the guide and the retainer slide axially within the chamber. In another embodiment, the recessed surface and the valve disc are configured to create back pressure that keeps the valve disc securely coupled to the recessed surface as the valve disc is moved to the open position. In another embodiment, a rib is formed to extend from the recessed surface to secure the valve disc against the recessed surface. In another embodiment the recessed surface includes an outer lip that facilitates the alignment between valve disc and the seat valve. Other embodiments include a combination of the above-identified features. For example, an embodiment of a pressure relief valve disclosed herein includes a combination of (1) the guide and the retainer creating multiple contact points axially along a longitudinal axis of the valve body to deter the valve disc from tilting within the chamber, (2) the guide and the retainer including small rounded surfaces that contact valve body within the chamber to reduce friction between those components as the guide and the retainer slide axially within the chamber, (3) the recessed surface and the valve disc being configured to create back pressure that keeps the valve disc securely coupled to the recessed surface as the valve disc is moved to the open position, (4) a rib being formed to extend from the recessed surface to secure the valve disc against the recessed surface and/or (5) the recessed surface including an outer lip that facilitates the alignment between valve disc and the seat valve.

Turning to the figures, an example pressure relief valve 100 disclosed herein includes a valve body 200, a seat body 300, a valve disc 400, a guide 500, a retainer 600, a spring 700, and a cap 800. In other examples as disclosed below in greater detail, the pressure relief valve 100 disclosed herein includes the valve body 200, the seat body 300, a valve disc 450, the guide 500, the retainer 600, the spring 700, and the cap 800.

Figure 4:
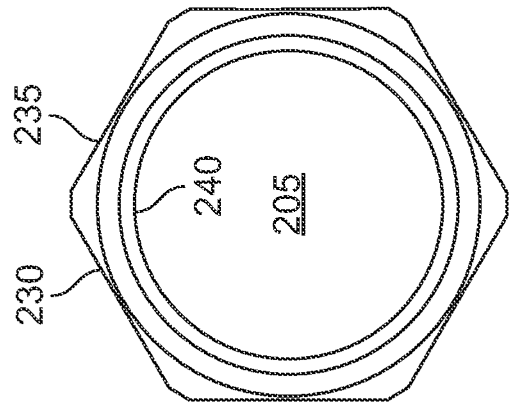
FIG. 4 is an end view of the body of FIG. 3.
Figure 3:
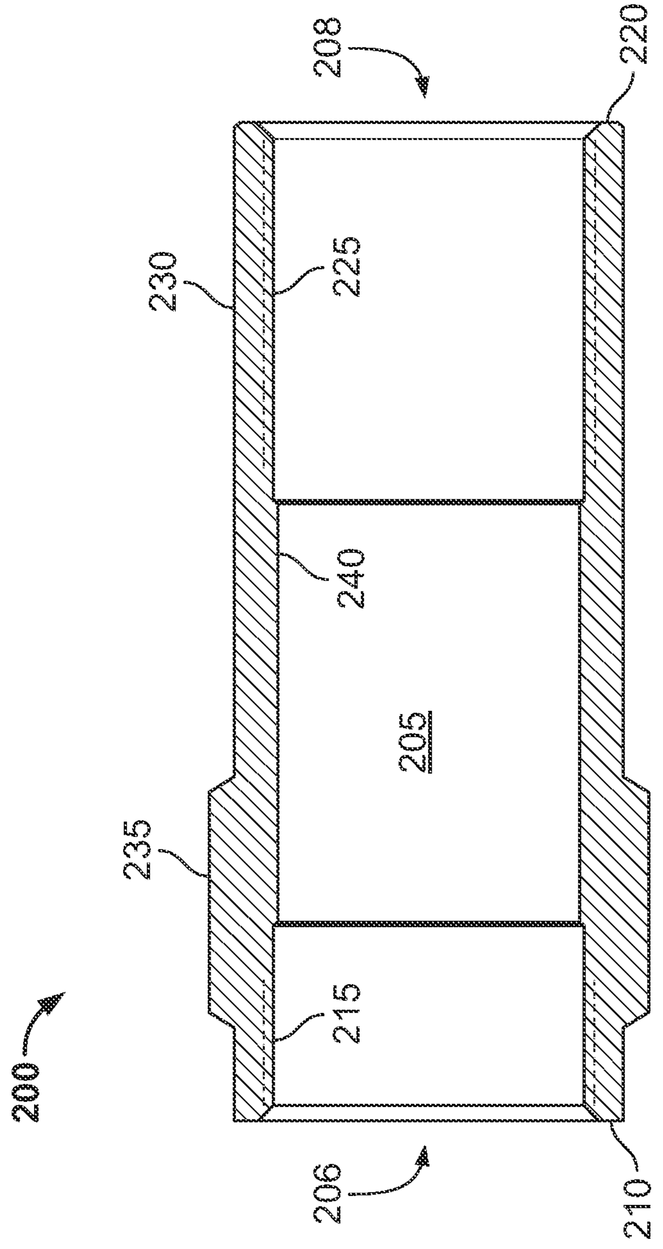
FIG. 3 is a side cross-sectional view of an example body of the pressure relief valve of FIG. 1 in accordance with the teachings herein.

As shown in FIGS. 3-4, the valve body 200 is a hollow tube that defines a chamber 205. The chamber 205 extends along a longitudinal axis of the valve body 200 between an inlet 206 and an outlet 208. The body includes a first end 210 (also referred to as an “inlet-side end”) and a second end 220 (also referred to as an “outlet-side end”) opposite the first end 210. The first end 210 defines the inlet 206, and the second end 220 defines the outlet 208. The outlet of the valve body 200 forms the outlet 120 of the pressure relief valve 100.

Figure 19:
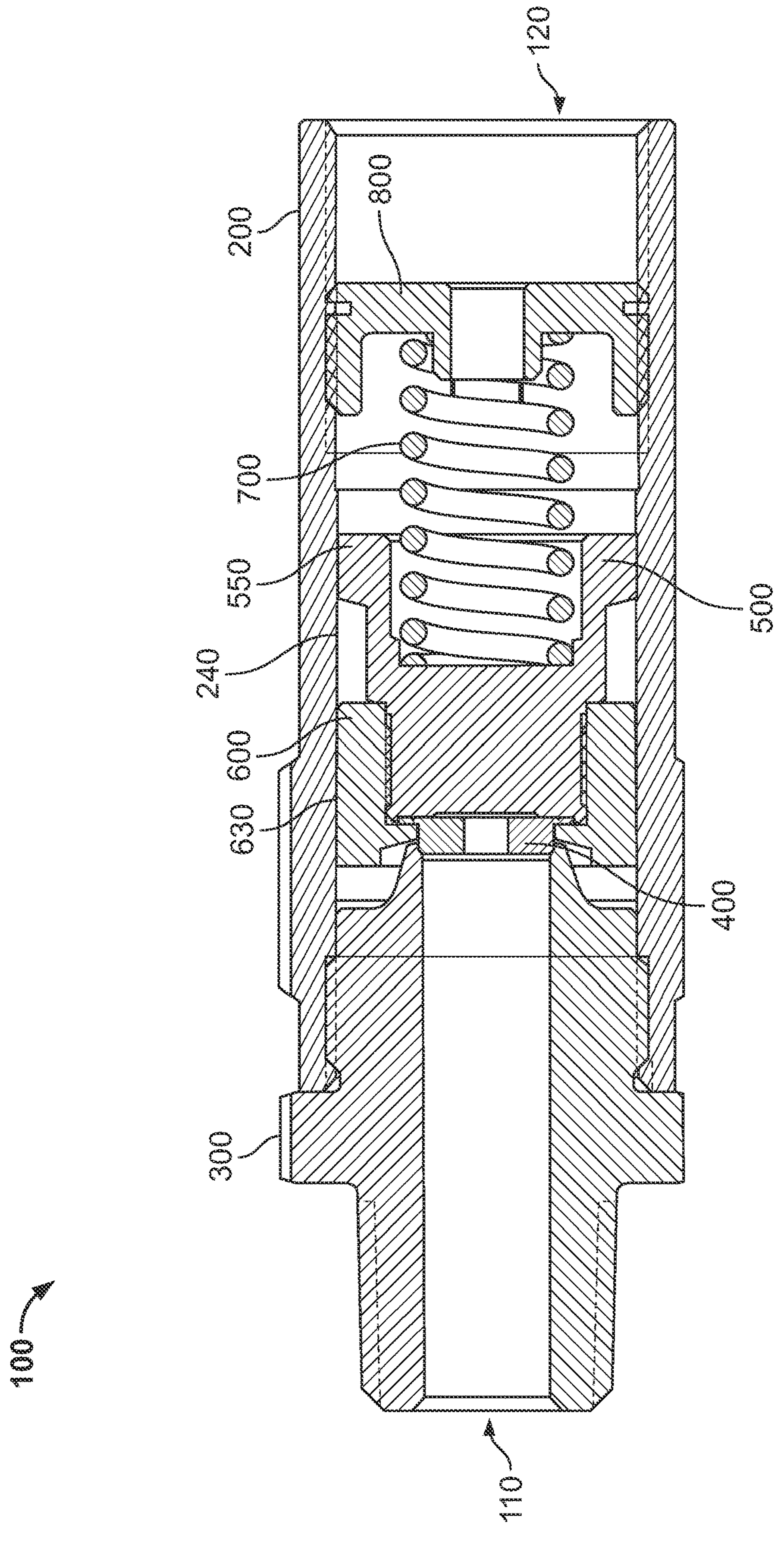
FIG. 19 is a first side cross-sectional view of the pressure relief valve of FIG. 1 having the valve disc of FIG. 8 in accordance with the teachings herein.
Figure 20:
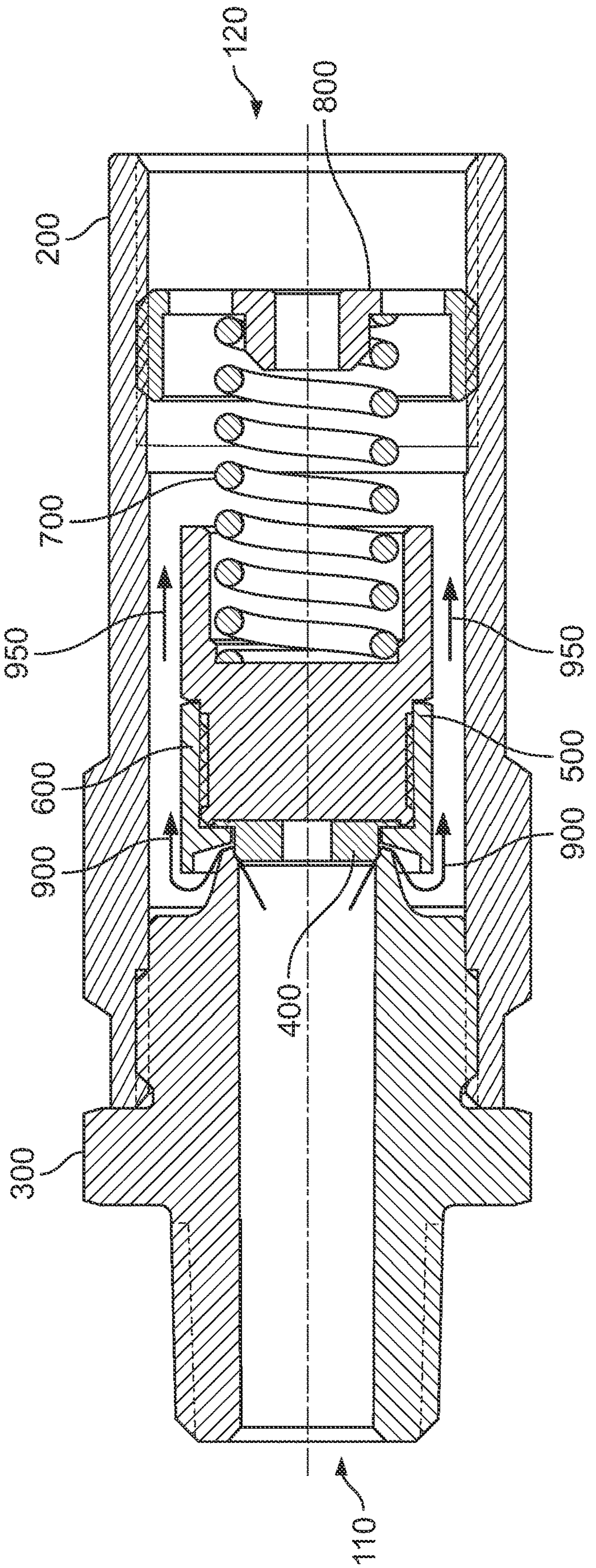
FIG. 20 is a second side cross-sectional view of the pressure relief valve of FIG. 1 having the valve disc of FIG. 8 in accordance with the teachings herein.
Figure 22:
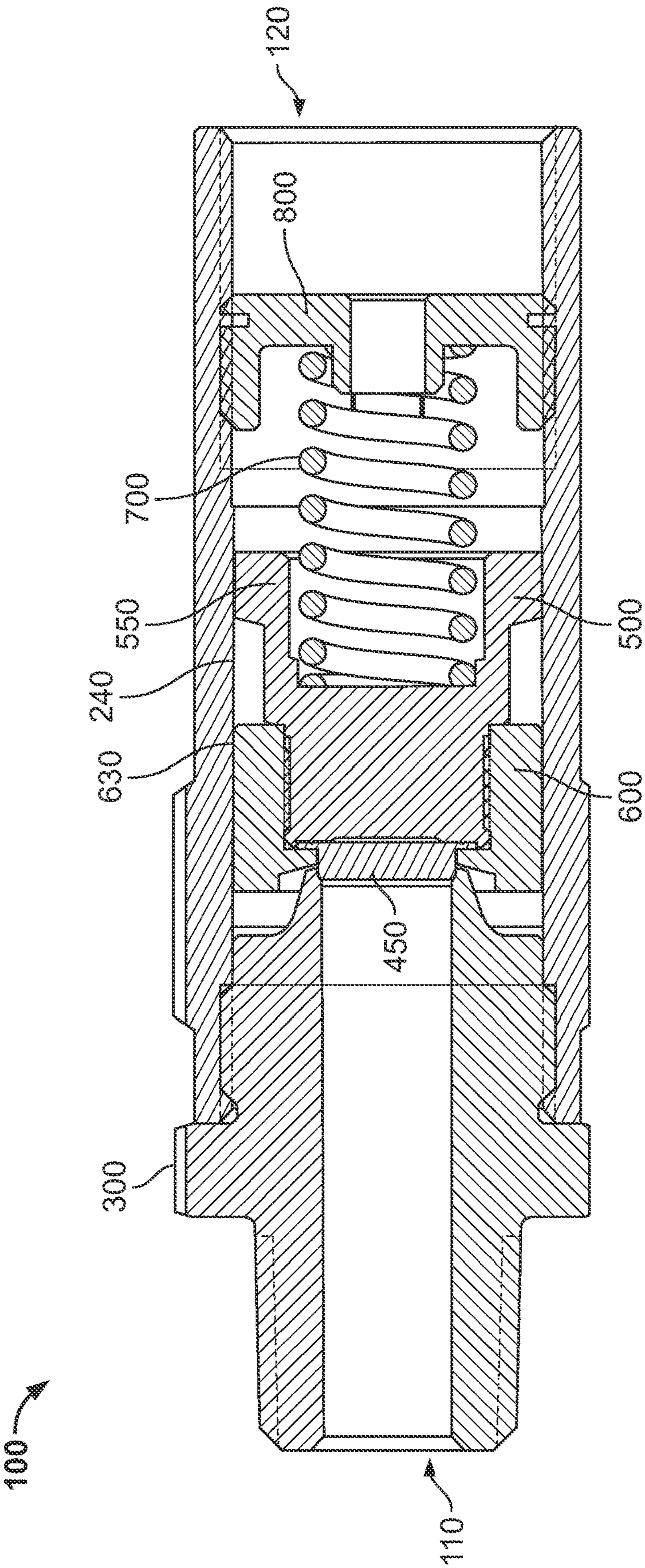
FIG. 22 is a side cross-sectional view of the pressure relief valve of FIG. 1 having the valve disc of FIG. 9 in accordance with the teachings herein.

The body also includes an outer surface 230 and an inner surface 240 that extend between the first and second ends 210, 220. The outer surface 230 is substantially cylindrical and includes a polygonal portion 235 (e.g., a hexagonal portion) configured to be received by a tool for assembly of the pressure relief valve 100. In the illustrated example, the polygonal portion 235 is adjacent the first end 210. The inner surface 240 is cylindrical and forms the through hole that is substantially cylindrical. Internal threads 215 are located along the inner surface 240 at the first end 210, and internal threads 225 are located along the inner surface 240 at the second end 220. As shown in FIGS. 19-20 and 22, the internal threads 215 are configured to threadably couple the seat body 300 to the valve body 200, and the internal threads 225 are configured to threadably couple the cap 800 to the valve body 200. As disclosed below in greater detail, FIGS. 19-20 depict the pressure relief valve 100 assembled with the valve disc 400, and FIG. 22 depicts the pressure relief valve 100 assembled with the valve disc 450.

Figure 5:
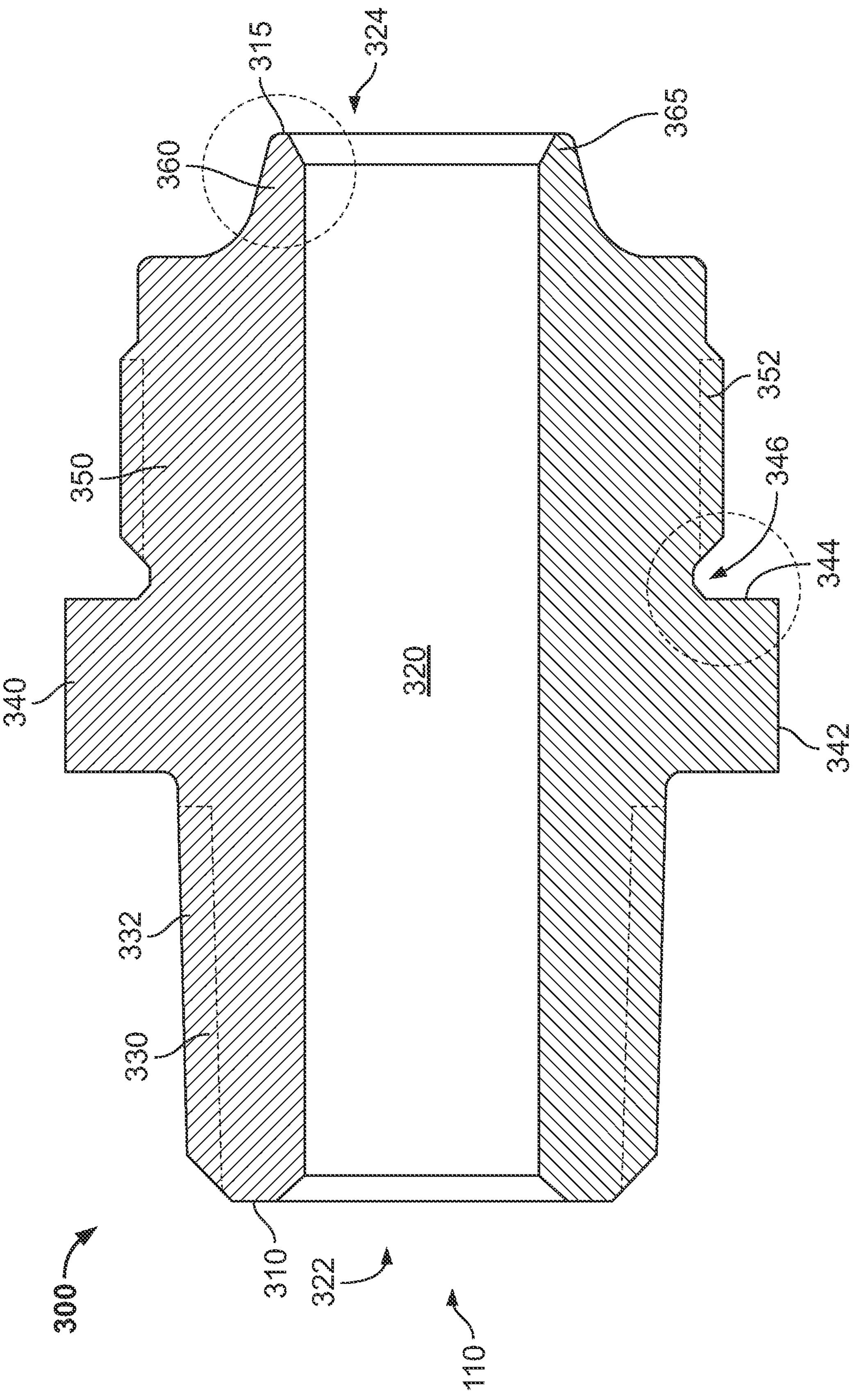
FIG. 5 is a side cross-sectional view of an example seat body of the pressure relief valve of FIG. 1 in accordance with the teachings herein.

As shown in FIG. 5, the seat body 300 includes a first end 310 (also referred to as an “inlet-side end”) and a second end 315 (also referred to as an “outlet-side end”) opposite the first end 310. The seat body 300 defines a through hole 320 that extends along a longitudinal axis of the seat body 300. The through hole 320 extends between an inlet 322 and an outlet 324. The inlet 322 of the seat body 300 forms the inlet 110 of the pressure relief valve 100.

The seat body 300 of the illustrated example includes an inlet-side portion 330, an outer flange 340, a middle portion 350, and the outlet-side portion 360. The inlet-side portion 330 is adjacent the first end 310 of the seat body 300, and the outlet-side portion 360 is adjacent the second end 315. The outer flange 340 is positioned axially between the inlet-side portion 330 and the middle portion 350, and the middle portion 350 is positioned axially between the outer flange 340 and the outlet-side portion 360.

Figure 6:
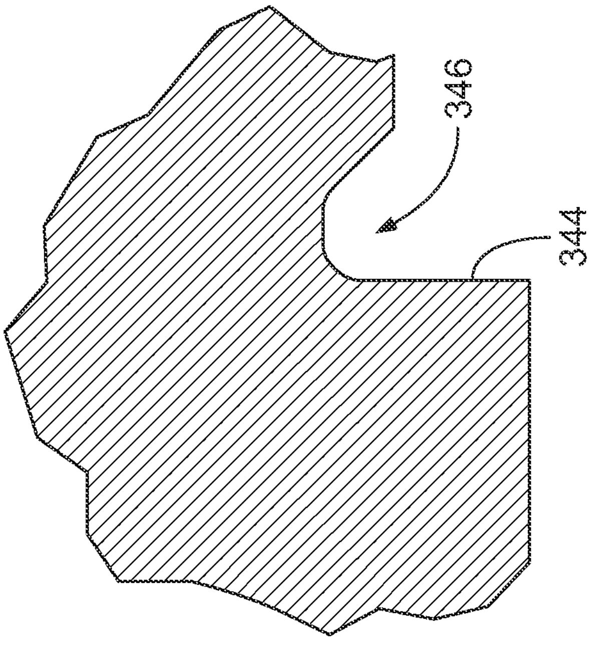
FIG. 6 is an expanded view of a first portion of the seat body of FIG. 5.

The middle portion 350 of the seat body 300 includes external threads 352. As shown in FIGS. 19-20 and 22, the external threads 352 are configured to be received by the internal threads 215 of the valve body 200 to couple the seat body 300 to the valve body 200 of the pressure relief valve 100. The outer flange 340 includes an outer surface 342 and an adjacent side surface 344. The outer surface 342 extends circumferentially about the longitudinal axis of the seat body 300, and the side surface 344 extends radially outward relative to the longitudinal axis. The side surface 344 of the outer flange 340 is configured to engage the first end 210 of the valve body 200 when the seat body 300 is securely coupled to the valve body 200. As shown in FIGS. 5-6, a groove 346 is formed between the side surface 344 of the outer flange 340 and the external threads 352 of the middle portion 350. The groove 346 is configured to receive a lip formed at the first end 210 of the valve body 200 to further facilitate the secure coupling of the seat body 300 to the valve body 200 of the pressure relief valve 100. Additionally, as shown in FIG. 5, the inlet-side portion 330 defines external threads 332 that are configured to threadably couple the pressure relief valve 100 to another structure (e.g., a storage tank).

As shown in FIG. 5, the outlet-side portion 360 of the seat body 300 defines a valve seat 365 along the second end 315 and adjacent the outlet 324 of the through hole 320. When the seat body 300 is coupled to the valve body 200, as shown in FIGS. 19-20 and 22, the valve seat 365 is positioned within the chamber 205 of the valve body 200 so that valve seat 365 is adjacent the valve disc 400, 450.

Figure 7:
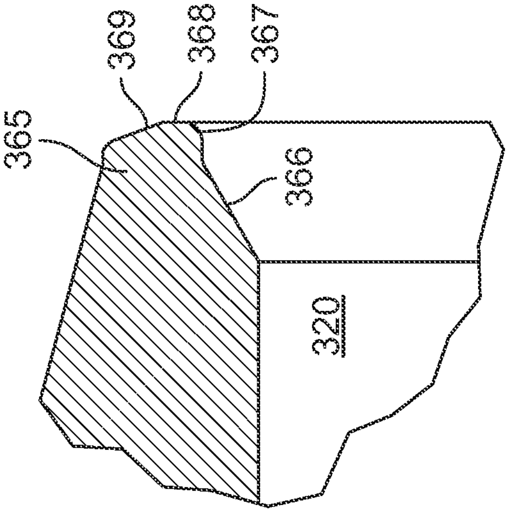
FIG. 7 is an expanded view of a second portion of the seat body of FIG. 5.
Figure 21:
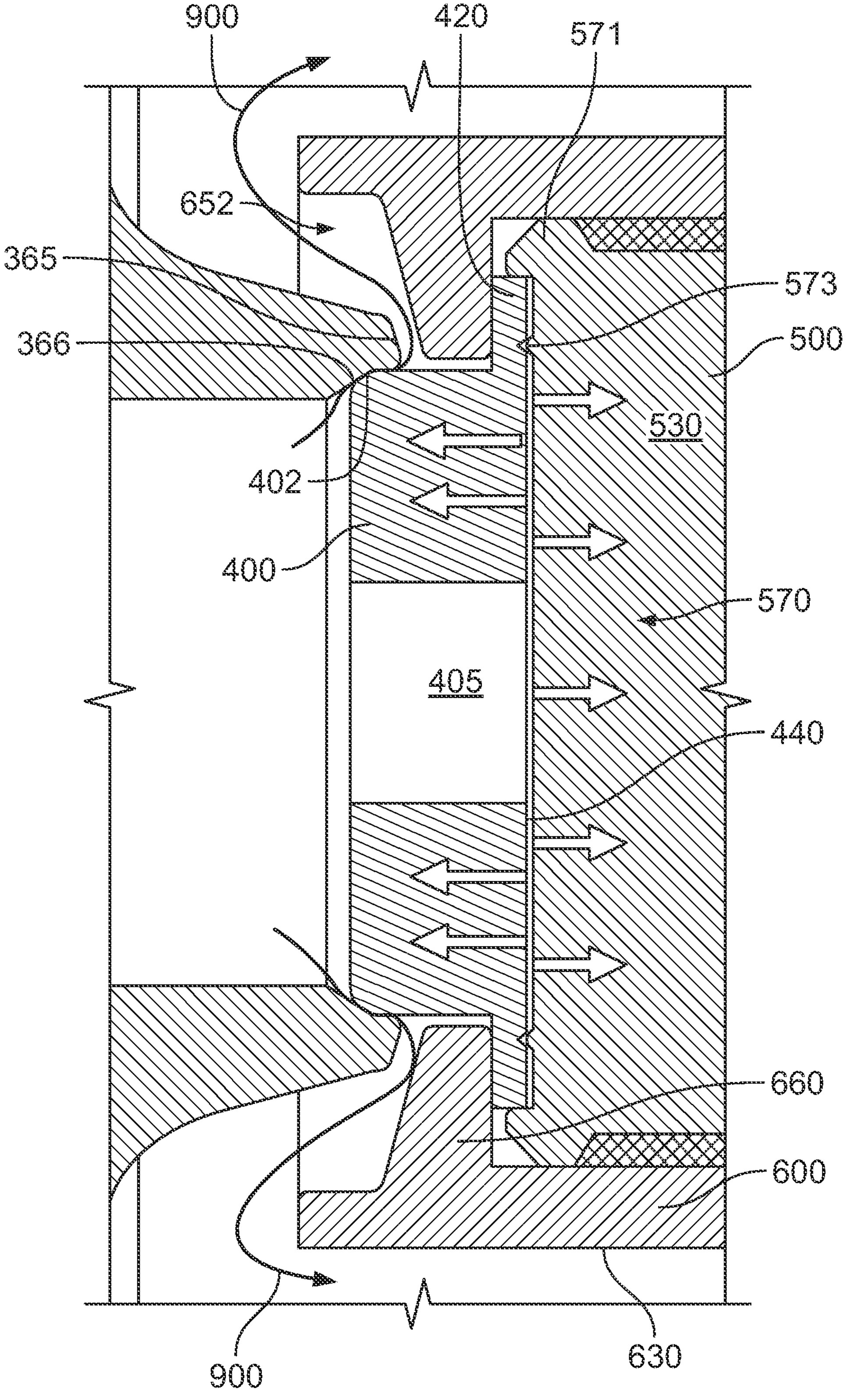
FIG. 21 is an expanded view of a portion of the cross-sectional view of FIG. 20.

Turning to FIG. 7, the valve seat 365 includes a countersunk surface 366, a curved surface 367, an end surface 368, and an outer surface 369. The curved surface 367 is adjacent and between the countersunk surface 366 and the end surface 368, and the end surface 368 is adjacent and between the curved surface 367 and the outer surface 369. The countersunk surface 366 and the curved surface 367 define the outlet 324 of the through hole 320 of the seat body 300. As shown in FIG. 21, the countersunk surface 366 and the curved surface 367 are positioned and shaped to sealingly engage a sealing surface 402, 452 of the valve disc 400, 450 when the valve disc 400, 450 is in a closed position.

Figure 8:
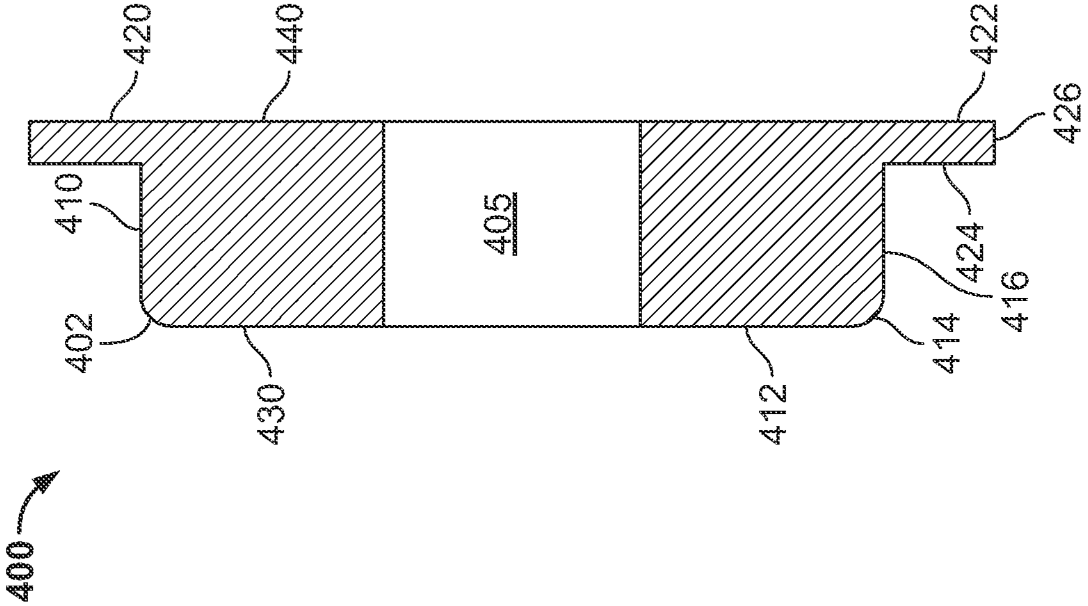
FIG. 8 is a side cross-sectional view of an example valve disc of the pressure relief valve of FIG. 1 in accordance with the teachings herein.

Turning to FIG. 8, the valve disc 400 is composed of a material, such as polychlorotrifluoroethylene or other plastic material, that is configured to withstand the extremely cold temperatures (e.g., −253° C.) of liquid hydrogen applications. The valve disc 400 includes a disc body 410 and a flange 420 extending radially outward from the disc body 410. The disc body 410 and the flange 420 are integrally and monolithically formed together. Both the disc body 410 and the flange 420 are cylindrical with the flange 420 having a greater outer circumference than that of the disc body 410. A first end 430 (also referred to as an "inlet-side end") of the valve disc 400 is formed by the disc body 410, and a second end 440 (also referred to as an "outlet-side end") opposite the first end 430 is formed by the flange 420.

The disc body 410 defines an inlet-side surface 412 at the first end 430 of the valve disc 400. The disc body 410 also defines an edge 414 extending between and adjacent the inlet-side surface 412 and an outer circumferential surface 416 of the disc body 410. In the illustrated example, the edge 414 is a rounded edge or a fillet. In other examples, the edge 414 is a chamfered edge. The edge 414 defines the sealing surface 402 of the valve disc 400. As shown in FIGS. 19-21, the sealing surface 402 is configured to sealingly engage the valve seat 365 of the seat body 300 to close the pressure relief valve 100.

Returning to FIG. 8, the flange 420 defines an outlet-side surface 422 and an under-side surface 424 opposite a portion of the outlet-side surface 422. The flange 420 also defines an outer circumferential surface 426 that extends a length of the flange 420 between the under-side surface 424 and the outlet-side surface 422. As shown in FIGS. 19-21, the flange 420 is configured to securely position the valve disc 400 between the guide 500 and the retainer 600. For example, the outlet-side surface 422 is configured to be received by a recessed surface 570 of the guide 500, and the under-side surface 424 is configured to engage an outlet-side surface 664 of the inner ledge 660 of the retainer 600. Further, in the illustrated example, the outer circumferential surface 426 is configured to engage an outer lip 571 of a first guide end 510 of the guide 500.

In the illustrated example, the disc body 410 and the flange 420 of the valve disc 400 defines a through hole 405 that extends axially along a center axis of the valve disc 400. The through hole 405 extends between the first and second ends 430, 440 of the valve disc 400 such that the through hole extends from the inlet-side surface 412 of the disc body 410, along the length of the disc body 410 and the flange 420 and to the outlet-side surface 422 of the flange 420. The through hole 405 enables a back pressure to be created within a gap of the recessed surface 570 that keeps the flange 420 of the valve disc 400 coupled to the recessed surface 570 when the valve disc 400 is moved to the open position. For example, when a tank pressure is proximate a relatively high pressure setting (e.g., 350 pounds per square inch (PSI)) associated with the biasing force of the spring 700, the back pressure causes the valve disc 400 to flex in a manner that tightly secures the valve disc 400 to the recessed surface 570 of the guide 500. For example, the valve disc 400 is composed of plastic material to facilitate the flexing of the valve disc 400. That is, the valve disc 400 is tightly secured to the retainer 600 and the recessed surface 570 of the guide 500 when the tank pressure is near the relatively high pressure setting. When the tank pressure exceeds the relatively high pressure setting, the valve disc 400, the guide 500, and the retainer 600 remain fixed together and move away from the valve seat 365 as a unit toward the open position.

Figure 9:
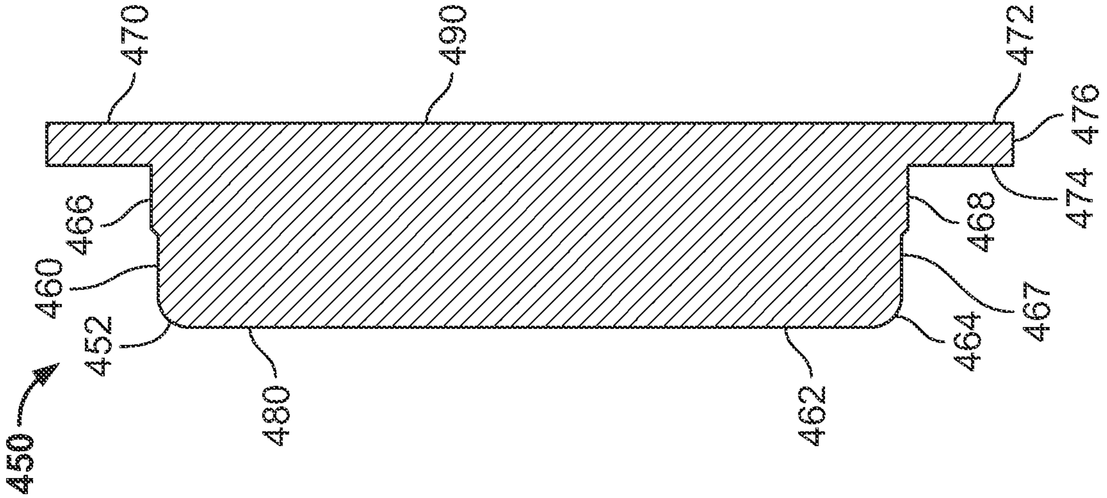
FIG. 9 is a side cross-sectional view of another example valve disc of the pressure relief valve of FIG. 1 in accordance with the teachings herein.

Turning to FIG. 9, the valve disc 450 is composed of a material, such as polychlorotrifluoroethylene, that is configured to withstand the extremely cold temperatures (e.g., −253° C.) of liquid hydrogen applications. The valve disc 450 includes a disc body 460 and a flange 470 extending radially outward from the disc body 460. The disc body 460 and the flange 470 are integrally and monolithically formed together. Both the disc body 460 and the flange 470 are cylindrical with the flange 470 having a greater outer circumference than that of the disc body 460. A first end 480 (also referred to as an "inlet-side end") of the valve disc 450 is formed by the disc body 460, and a second end 490 (also referred to as an "outlet-side end") opposite the first end 480 is formed by the flange 470.

The disc body 460 defines an inlet-side surface 462 at the first end 480 of the valve disc 450. The disc body 460 also defines an edge 464 extending between and adjacent the inlet-side surface 462 and an outer circumferential surface 466 of the disc body 460. In the illustrated example, the edge 464 is a rounded edge or a fillet. In other examples, the edge 464 is a chamfered edge. The edge 464 defines a sealing surface 452 of the valve disc 450. As shown in FIG. 22, the sealing surface 452 is configured to sealingly engage the valve seat 365 of the seat body 300 to close the pressure relief valve 100.

Returning to FIG. 9, the outer circumferential surface 466 of the disc body 460 is a stepped circumferential surface with a first outer circumferential surface 467 and a second outer circumferential surface 468. As shown in FIG. 9, the second outer circumferential surface 468 is positioned axially between the first outer circumferential surface 467 and the flange 470. The second outer circumferential surface 468 is larger than the first outer circumferential surface 467 and smaller than an outer circumferential surface 476 of the flange 470. In the illustrated example, the valve disc 450 is a solid block without a through hole (e.g., the through hole 405) that facilitates the valve disc 450 to remain secured to the recessed surface 570 in environments with relatively low pressure settings.

The flange 470 defines an outlet-side surface 472 and an under-side surface 474 opposite a portion of the outlet-side surface 472. The flange 470 also defines the outer circumferential surface 476 that extends a length of the flange 470 between the under-side surface 474 and the outlet-side surface 472. As shown in FIG. 22, the flange 470 is configured to securely position the valve disc 450 between the guide 500 and the retainer 600. For example, the outlet-side surface 472 is configured to be received by a recessed surface 570 of the guide 500, and the under-side surface 474 is configured to engage the outlet-side surface 664 of the inner ledge 660 of the retainer 600. Further, in the illustrated example, the outer circumferential surface 476 is configured to engage the outer lip 571 of the first guide end 510 of the guide 500.

Figure 10:
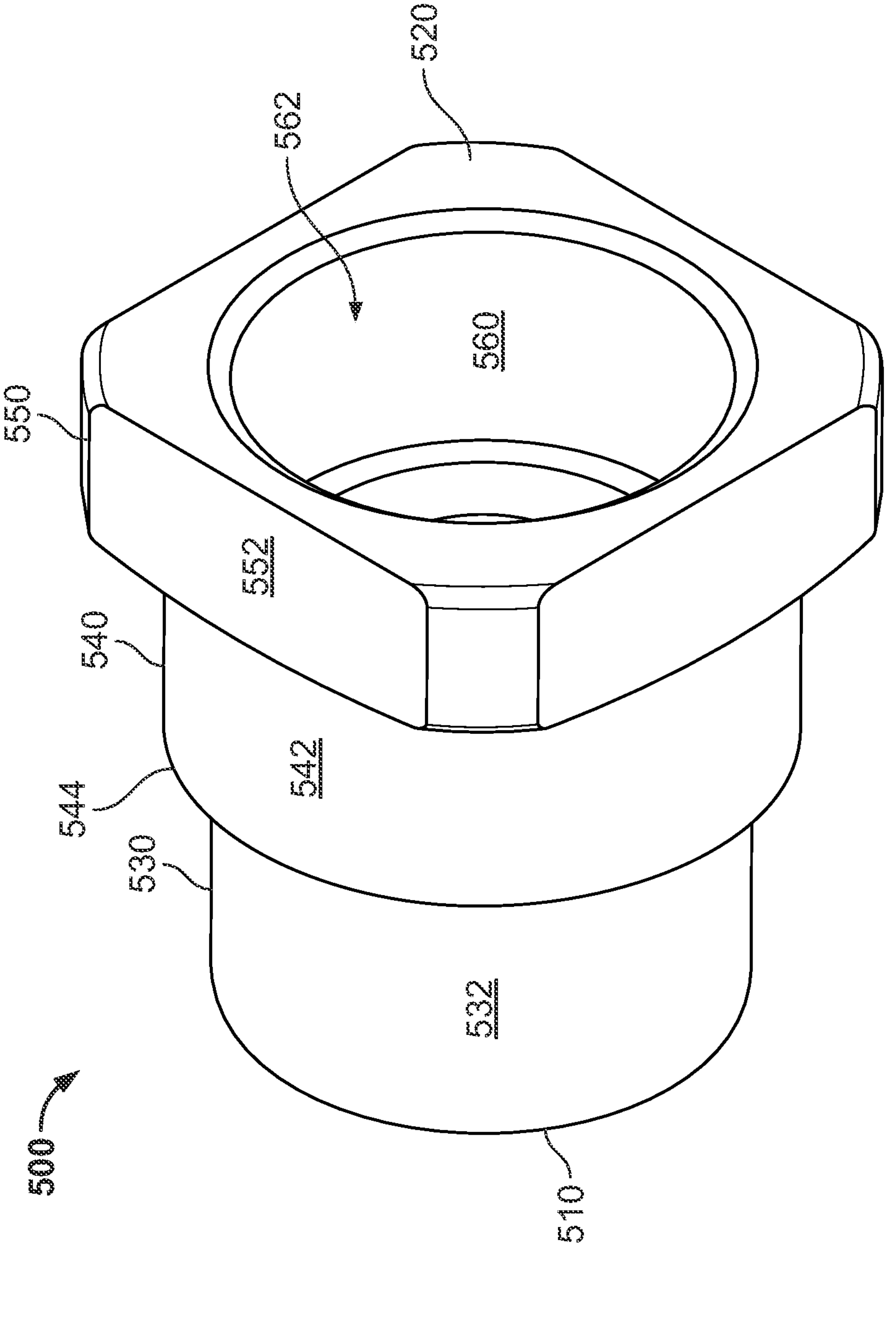
FIG. 10 is a perspective view of an example guide of the pressure relief valve of FIG. 1 in accordance with the teachings herein.
Figure 11:
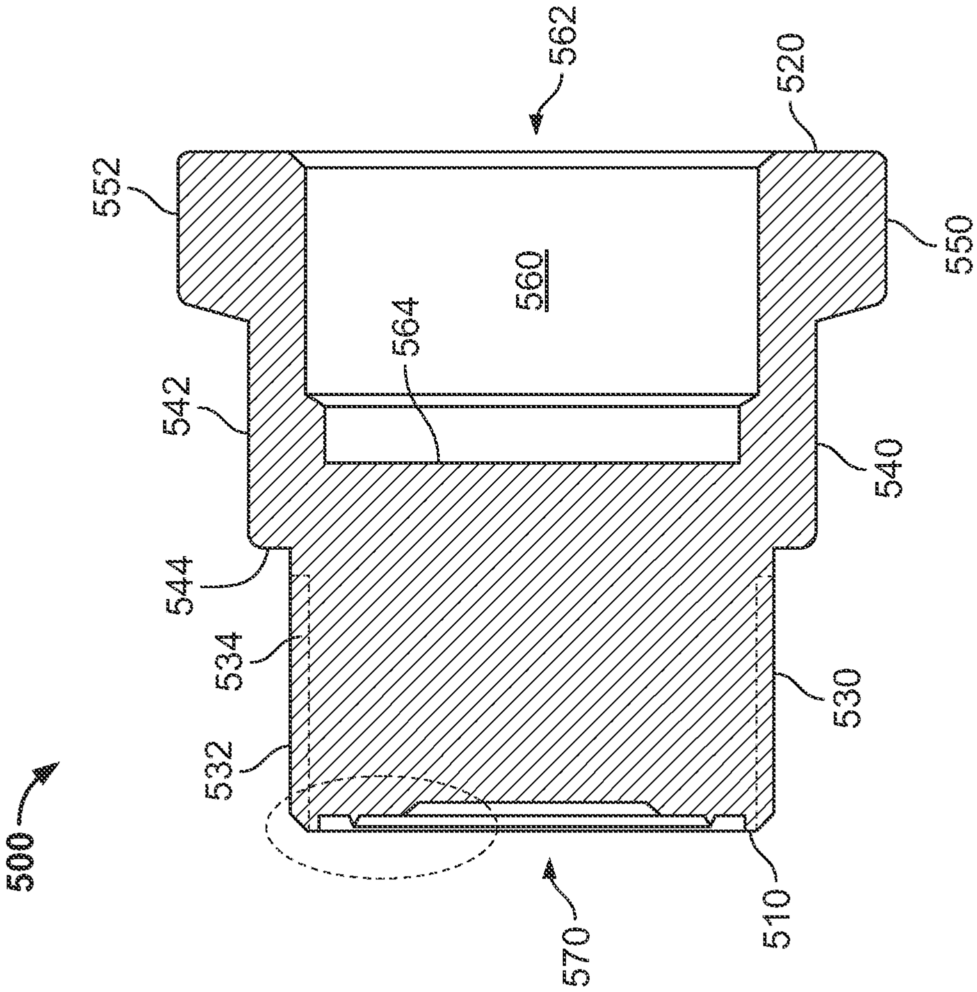
FIG. 11 is a side cross-sectional view of the guide of FIG. 10.

Turning to FIGS. 10-11, the guide 500 includes the first guide end 510 (also referred to as an "inlet-side end") and a second guide end 520 (also referred to as an "outlet-side end") opposite the first guide end 510. The guide 500 also includes an inlet-side portion 530, a middle portion 540, and an outlet-side portion 550. The inlet-side portion 530 is adjacent the first guide end 510, and the outlet-side portion 550 is adjacent the second guide end 520. The second guide end 520 defines an opening 562 to a bore hole 560 defined by the guide 500, and the first guide end 510 defines the recessed surface 570. In the illustrated example, the bore hole 560 extends from the second guide end 520, through the outlet-side portion 550, at least partially through the middle portion 540 of the guide 500, and to a spring surface 564.

As shown in FIG. 10, the inlet-side portion 530 of the guide 500 has an outer circumferential surface 532 that defines external threads 534 adjacent the first guide end 510. As shown in FIGS. 19-20 and 22, the external threads 534 are configured to be threadably received by the internal threads 646 of the retainer 600 to couple the guide 500 to the retainer 600.

Returning to FIGS. 10-11, the middle portion 540 of the guide 500 is positioned between the inlet-side portion 530 and the outlet-side portion 550 axially along a longitudinal axis of the guide 500. The middle portion 540 has an outer circumferential surface 542 with a circumference greater than that of the outer circumferential surface 532 of the inlet-side portion 530. That is, the middle portion 540 and the inlet-side portion 530 form a stepped outer circumferential surface of the guide 500. The middle portion 540 defines a stepped surface 544 extending radially between the outer circumferential surface 532 and the outer circumferential surface 542. As shown in FIGS. 19-20 and 22, the stepped surface 544 is configured to engage the second end 620 of the retainer 600 when the guide 500 is coupled to the retainer 600.

As shown in FIG. 10, the outlet-side portion 550 defines outer surfaces 552 that have a substantially polygonal cross-sectional shape. The outer surfaces 552 include flat surfaces or portions and rounded surfaces or portions in an alternating manner. In the illustrated example, the outer surfaces 552 include four relatively long flat portions and four relatively short rounded portions such that the outer surfaces 552 have a substantially square cross-section shape. The rounded portions of the outlet-side portion 550 of the guide 500 contact and/or are positioned adjacent the inner surface 240 of the valve body 200. The rounded portions of the guide 500 are configured to reduce friction between the guide 500 and valve body 200 as the guide 500 slides within the chamber 205. The flat portions are spaced apart from the inner surface 240 to partially define a flow path 950 around the guide 500 for fluid to flow from the inlet 110 and toward the outlet 120.

Figure 12:
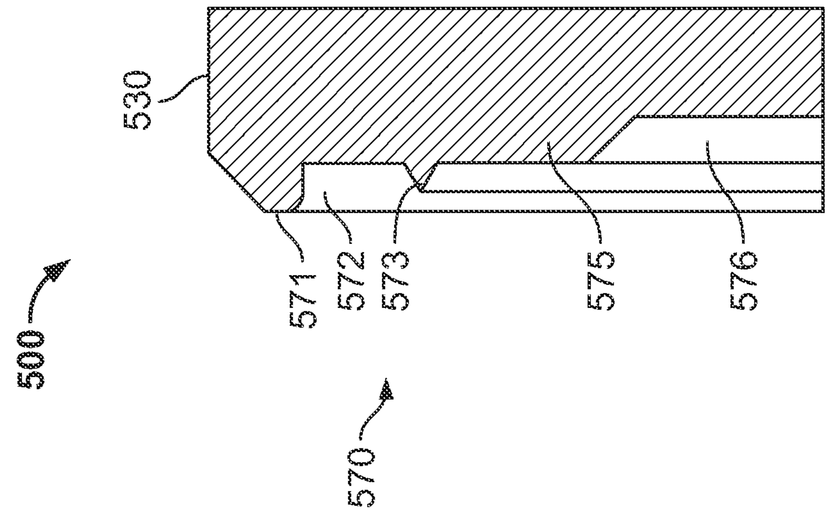
FIG. 12 is an expand view of a portion of the cross-sectional view of FIG. 11.

As shown in FIG. 21, the recessed surface 570 defined along the first guide end 510 of the guide 500 is configured to securely receive the second end 440 of the valve disc 400. Returning to FIG. 12, the guide 500 includes the outer lip 571 and a rib 573 that are positioned along the first guide end 510 to at least partially define the recessed surface 570. The outer lip 571 extends circumferentially around an outer edge of the first guide end 510 and defines an outer chamber 572 of the recessed surface 570. As shown in FIG. 21, the outer chamber 572 is configured to receive a portion of the flange 420, 470 of the valve disc 400, 450. The outer lip 571 is configured to engage the outer circumferential surface 426, 476 of the valve disc 400, 450 to ensure alignment of the valve disc 400, 450 along a longitudinal axis of the seat body 300 and, in turn, the valve seat 365. Returning to FIG. 12, the rib 573 extends circumferentially about a longitudinal axis of the guide 500 and is positioned radially between the longitudinal axis and the outer lip 571. The rib 573 includes a sharp or pointed apex that extends into the outer chamber 572 of the recessed surface 570. As shown in FIG. 12, the apex of the rib 573 is configured to dig into and/or otherwise grip the second end 440, 490 of the valve disc 400, 450 to securely retain the valve disc 400,450 within the recessed surface 570.

In the illustrated example of FIG. 12, the recessed surface 570 also includes an inner lip 575 that defines an inner chamber 576 of the recessed surface 570. As shown in FIG. 21, the second end 440, 490 of the valve disc 400, 450 is adjacent to but does not extend into the inner chamber 576 when received by the recessed surface 570 such that a gap is formed between the second end 440, 490 of the valve disc 400, 450 and an inner-most surface of the recessed surface 570. When the recessed surface 570 receives the valve disc 400, the through hole 405 of the valve disc 400 enables a back pressure to be produced that keeps the flange 420 of the valve disc 400 coupled to the recessed surface 570 when the valve disc 400 is moved to the open position.

Figure 14:
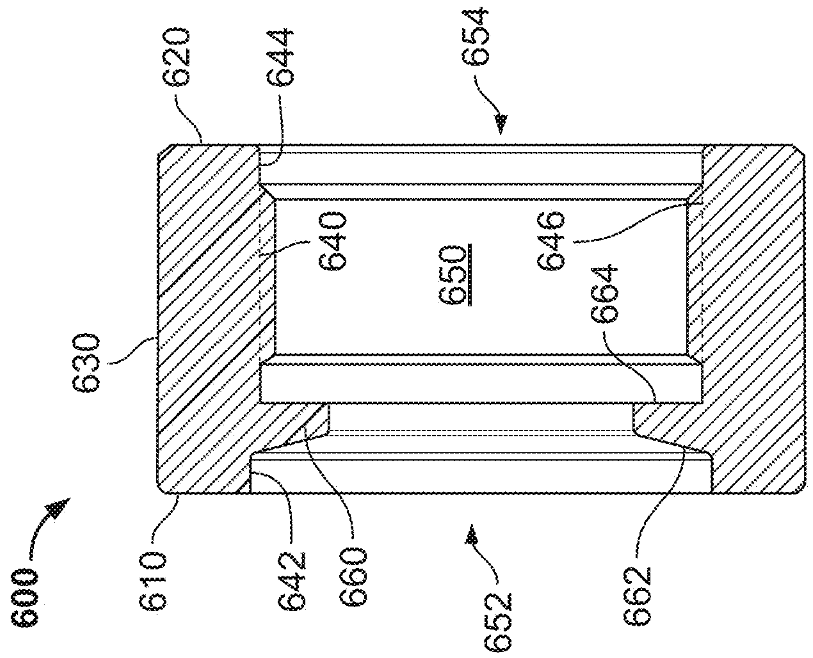
FIG. 14 is a side cross-sectional view of the disc retainer of FIG. 13.
Figure 13:
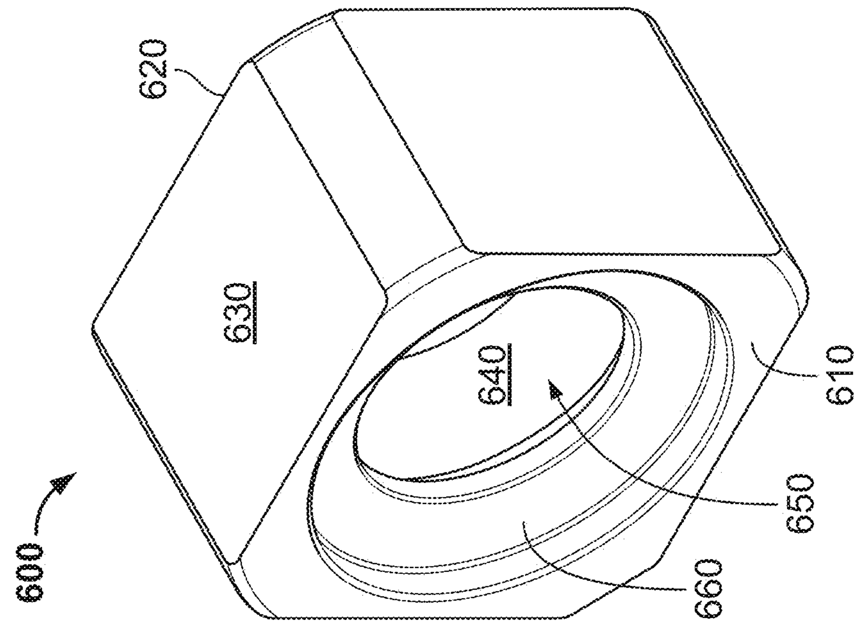
FIG. 13 is a perspective view of a disc retainer of the pressure relief valve of FIG. 1 in accordance with the teachings herein.

As shown in FIGS. 13-14, the retainer 600 includes a first end 610 (also referred to as an "inlet-side end") and a second end 620 (also referred to as an "outlet-side end") opposite the first end 610. The retainer 600 includes outer surfaces 630 and an inner surface 640, each of which extends between the first and second ends 610, 620.

Figure 18:
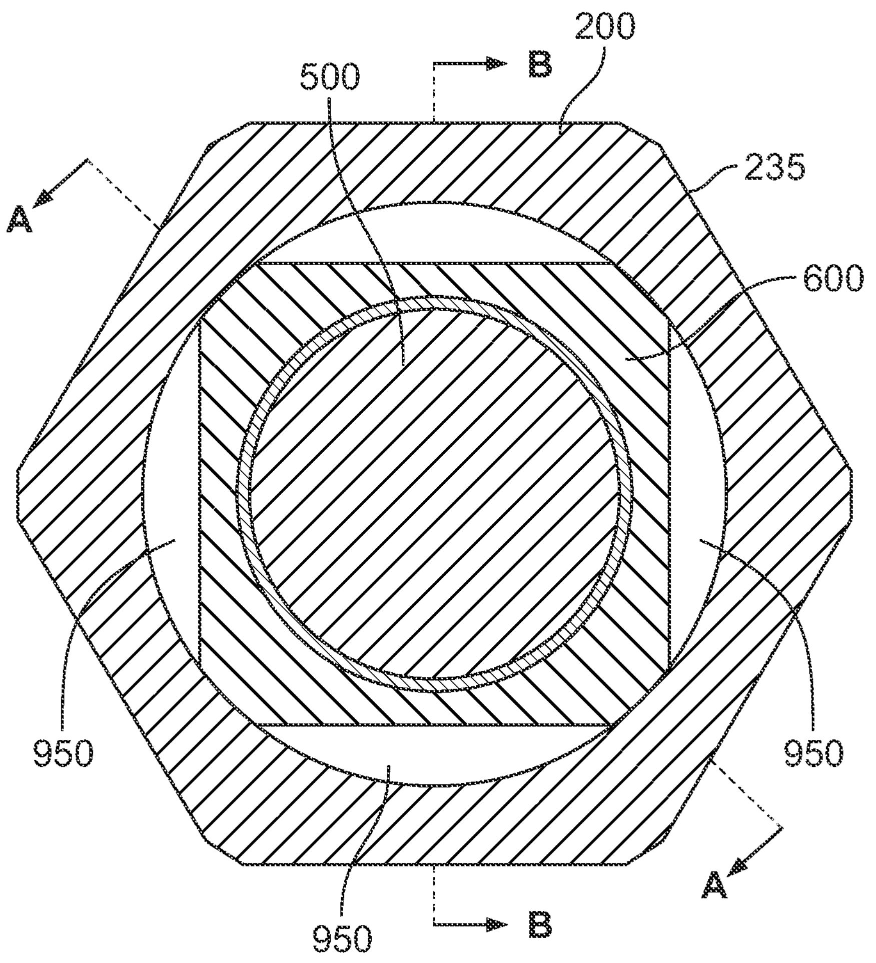
FIG. 18 is a rear cross-sectional view of the pressure relief valve of FIG. 1 in accordance with the teachings herein.

The outer surfaces 630 have a substantially polygonal cross-sectional shape. The outer surfaces 630 include flat surfaces or portions and rounded surfaces or portions in an alternating manner. In the illustrated example, the outer surfaces 630 include four relatively long flat portions and four relatively short rounded portions such that the outer surfaces 630 have a substantially square cross-section shape. As shown in FIG. 18, the rounded portions of the retainer 600 contact and/or are positioned adjacent the inner surface 240 of the valve body 200. The rounded portions of the retainer 600 are configured to reduce friction between the retainer 600 and valve body 200 as the retainer 600 slides within the chamber 205. The flat portions are spaced apart from the inner surface 240 to partially define a flow path 900 for fluid to flow around the retainer 600 from the inlet 110 and toward the outlet 120.

The inner surface 640 defines a chamber 650 (also referred to as a "recessed chamber") that extends between an inlet-side opening 652 at the first end 610 and an outlet-side opening 654 at the second end 620. As shown in FIG. 14, an inner ledge 660 of the retainer 600 extends radially inward from the inner surface 640 and into the chamber 650. The inner ledge 660 divides the inner surface 640 between an inlet-side inner surface 642 and an outlet-side inner surface 644. The inlet-side inner surface 642 is adjacent the inlet-side opening 652 at the first end 610, and the outlet-side inner surface 644 is adjacent the outlet-side opening 654 at the second end 620. The outlet-side inner surface 644 includes internal threads 646. As shown in FIGS. 19-20 and 22, the internal threads 646 are configured to threadably couple the guide 500 to the retainer 600.

Returning to FIG. 14, the inner ledge 660 includes an inlet-side surface 662 facing the inlet-side opening 652 and the opposing outlet-side surface 664 facing the outlet-side opening 654. The outlet-side surface 664 extends perpendicular to a longitudinal axis of the guide 500. The inlet-side surface 662 extends radially inward from the inner surface at an angle toward the outlet-side opening 654. As shown in FIGS. 19-20 and 22, the outlet-side surface 664 is configured to engage the under-side surface 424 of the flange 420 of the valve disc 400, and the inlet-side surface 662 is configured to be proximate to the valve seat 365 of the seat body 300 when the valve disc 400 is in a closed position.

Figure 17:
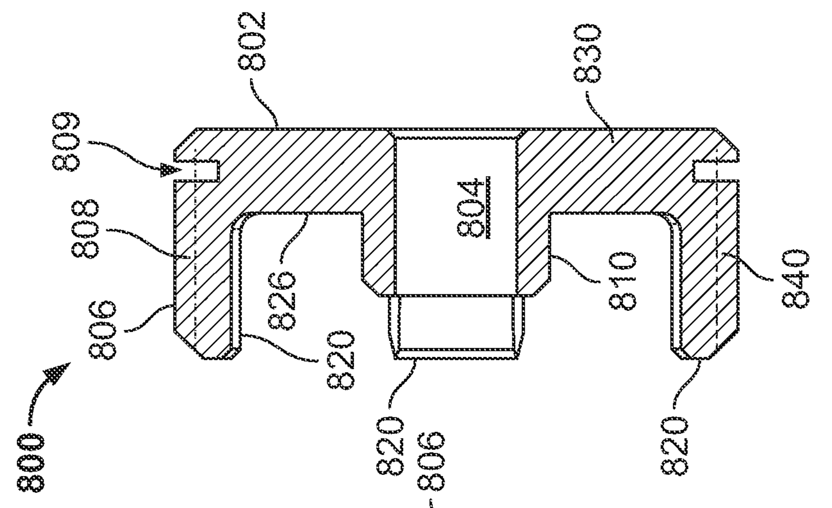
FIG. 17 is a side cross-sectional of the cap of FIG. 15.
Figure 16:
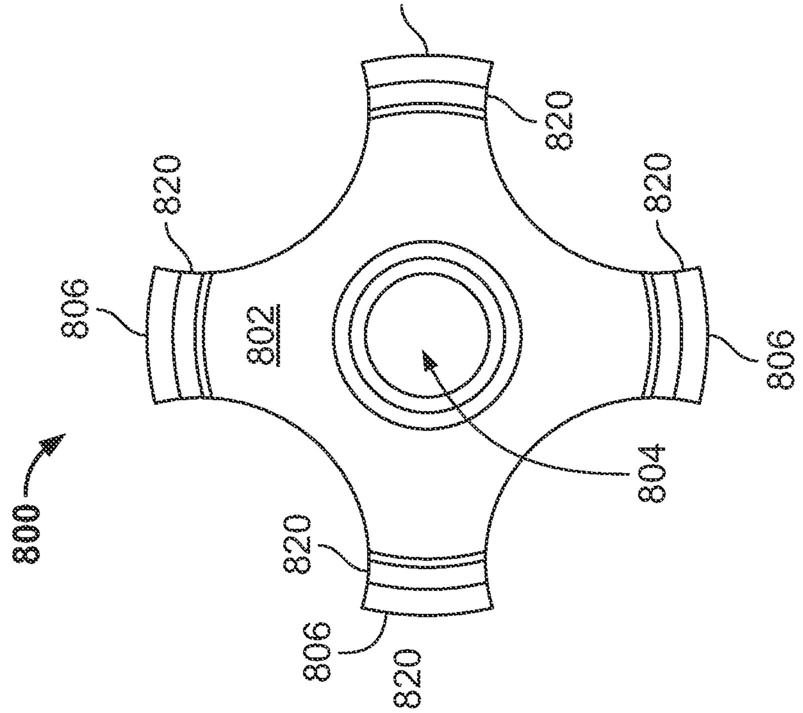
FIG. 16 is an end view of the cap of FIG. 15.
Figure 15:
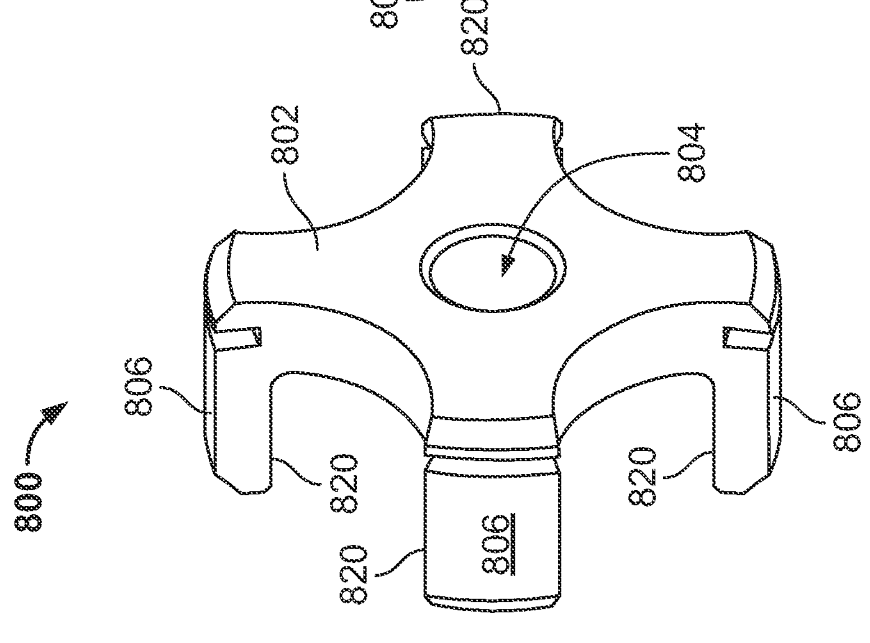
FIG. 15 is a perspective view of an example cap of the pressure relief valve of FIG. 1 in accordance with the teachings herein.

FIGS. 15-17 depict the cap 800 of the pressure relief valve 100. As shown in FIGS. 19-20 and 22, the cap 800 is configured to threadably couple to the valve body 200 and engage an end of the spring 700. The position of the cap 800 is configured to be threadably adjusted relative to the valve body 200 to enable an operator to adjust the biasing force applied by the spring and, in turn, select a threshold pressure at which the pressure relief valve 100 opens to release pressure.

Returning to FIGS. 15-17, the cap 800 includes a core 810 and a plurality of arms 820. The core 810 has a length that extends from an outer surface 802 in a first direction along a center axis of the cap 800. The core 810 also defines a through hole 804 of the cap 800 that extends the length of the core 810 along the center axis.

Each of the arms 820 extends radially outward from the core 810 and are spaced circumferentially (e.g., and equidistantly) apart from each other. In the illustrated example, the cap 800 includes four arms 820 that are spaced apart equidistantly from each by about 90 degrees. In other examples, the cap 800 may include more or less arms 820 that are spaced apart from each by different degrees. The arms 820 are spaced apart from each other to define openings through which fluid is to flow toward the outlet 120 of the pressure relief valve 100.

Each of the arms 820 also includes an inner portion 830 and an outer portion 840. For each of the arms 820, the inner portion 830 extends radially outward from the core 810. That is, a proximal end of the inner portion 830 is connected to the core 810. The inner portion 830 also has a thickness that extends between the outer surface 802 and an inner surface 826 in a direction parallel to the center axis of the cap 800. As shown in FIGS. 19-20 and 22, the inner surface 826 is configured to engage an end of the spring 700. Returning to FIGS. 15-17, the outer portion 840 of each of the arms 820 extends from the distal end of the inner portion 830. The outer portion 840 has a length and extends from the outer surface 802 in the first direction parallel to the center axis of the cap 800. In the illustrated example, the length of each the outer portion 840 of each of the arms 820 is greater than the length of the core 810. The outer portion 840 of each of the arms 820 defines a partial circumferential surface such that the outer portions 840 of the arms 820 define an outer circumferential surface 806 of the cap 800. The outer circumferential surface 806 includes external threads 808 of the cap 800. The external threads 808 are configured to be threadably received by the internal threads 225 of the valve body 200 to couple the cap 800 to the valve body 200.

As disclosed below in greater detail, the external threads 808 enable an operator to adjust a biasing force applied by the spring 700 by adjusting the position of the cap 800 relative to the valve body 200. After the operator has positioned the cap 800 in a desired location associated with a desired biasing force, the operator is able to fix the cap 800 in place relative to the valve body 200 by punching the cap 800. For example, the cap 800 includes a locking groove 809 that extends circumferentially along the outer circumferential surface 806 adjacent the outer surface 802. To fix the cap 800 in place, the operator punches the outer surface 802 adjacent the locking groove 809 to cause the portion of the cap 800 adjacent the groove 809 to deform. The deformation of the cap 800 adjacent the groove 809 prevents presents the cap 800 from being further rotated via the external threads 808 and the internal threads, thereby preventing the position of the cap 800 from being subsequently adjusted.

FIGS. 18-20 depict the pressure relief valve 100 with the valve disc 400 in an assembled state. FIG. 18 is a rear cross-sectional view of the pressure relief valve 100. FIG. 19 is a side cross-sectional view of the pressure relief valve 100 taken along plane A-A of FIG. 18, and FIG. 20 is another side cross-sectional view of the pressure relief valve 100 taken along plane B-B of FIG. 18. Additionally, FIG. 21 is an expanded cross-sectional view of the valve disc 400 and the valve seat 365 in a closed position. FIG. 22 depicts the pressure relief valve 100 assembled with the valve disc 450 in a closed position.

To assemble the pressure relief valve 100, the external threads 352 of the seat body 300 is coupled to the internal threads 215 of the valve body 200. The valve disc 400, 450 is inserted into the chamber 650 of the retainer 600 through the outlet-side opening 654 such that the under-side surface 424, 474 of the flange 420, 470 of the valve disc 400, 450 engages the outlet-side surface 664 of the inner ledge 660 of the retainer 600. The external threads 534 of the guide 500 are threadably received by the internal threads 646 of the retainer 600 to insert the inlet-side portion 530 of the guide 500 into the chamber 650 of the retainer 600 through the outlet-side opening 654. The inlet-side portion 530 of the guide 500 is inserted into the chamber 650 of the retainer 600 until the recessed surface 570 of the of the guide 500 receives the flange 420, 470 of the valve disc 400, 450 such that the flange 420, 470 is configured securely positioned between the guide 500 and the retainer 600. When the recessed surface 570 of the of the guide 500 engages the valve disc 400, 450, the outer lip 571 of the recessed surface 570 engages the outer circumferential surface 426, 476 of the valve disc 400, 450 to align of the valve disc 400, 450 with the valve seat 365 along a longitudinal axis of the seat body 300. The rib 573 digs into and/or otherwise grips the flange 420, 470 of the valve disc 400, 450 to securely retain the valve disc 400,450 in place.

The valve disc 400, 450, the guide 500, and the retainer 600 are inserted into the chamber 205 of the valve body 200 through the outlet 208 of the valve body 200. The valve disc 400, 450, the guide 500, and the retainer 600 are positioned within the chamber 205 of the valve body 200 such that the sealing surface 402, 452 of the valve disc 400, 450 engages the valve seat 365 of the seat body 300. The rounded portions of the outer surfaces 552 of the guide 500 and the rounded portions of the outer surfaces 630 of the retainer 600 engage the inner surface 240 of the valve body 200 to stabilize the valve disc 400, 450 by deterring the valve disc 400, 450 from tilting relative to the longitudinal axis of the valve body 200 when positioned within the chamber 205. As shown in FIGS. 19 and 22, the rounded portions of the outer surfaces 552 of the guide 500 and the rounded portions of the outer surfaces 630 of the retainer 600 are spaced apart from each to create multiple contact points along the longitudinal axis of the valve body 200 to further deter the valve disc 400, 450 from tilting within the chamber 205. Additionally, the flat portions of the outer surfaces 552 of the guide 500 are spaced apart from the inner surface 240 of the valve body 200 to define the flow path 950 around the guide 500 (FIGS. 18 and 20), and the flat portions of the outer surfaces 630 of the retainer 600 are spaced apart from the inner surface 240 of the valve body 200 to define the flow path 900 around the retainer 600 (FIG. 20). That is, each of the guide 500 and the retainer 600 has a portion with a substantially polygonal cross-sectional shape that defines the flow paths 950, 900, respectively, for fluid flowing through the pressure relief valve 100.

Subsequently, the spring 700 is inserted into the chamber 205 of the valve body 200 through the outlet 208 of the valve body 200. The spring 700 is positioned such that a first end of the spring 700 extends into the bore hole 560 of the guide 500 and engages the spring surface 564 at the end of the bore hole 560. The cap 800 is then inserted into the chamber 205 of the valve body 200 through the outlet 208. The external threads 808 of the cap 800 are threadably received by the internal threads 225 of the valve body 200 to threadably couple the cap 800 to the valve body 200. When the cap 800 is threadably coupled to the valve body 200, the inner surface 826 of each of the arms 820 of the cap 800 engages a second end of the spring 700. In turn, the cap 800 is securely coupled to the valve body 200 to enable the spring 700 to apply a biasing force to the valve disc 400 via the guide 500. The cap 800 threadably couples to the valve body 200 to enable an operator to adjust the biasing force of the spring 700. When the cap 800 is threadably positioned at a location corresponding with a selected biasing force, the operator is able to fix the cap 800 in place relative to the valve body 200 by punching the cap 800 adjacent the locking groove 809 to deter the position of the cap 800 from being repeatedly adjusted over time.

Once the pressure relief valve 100 is assembled together, the pressure relief valve 100 is configured to be threadably couple to a storage tank via the external threads 332 of the seat body 300 to enable the pressure relief valve 100 to relieve excess pressure built up within the tank.

When the pressure relief valve 100 is assembled, the valve disc 400, 450 is configured to slide axially between a closed position and an open position along the longitudinal axis of the pressure relief valve 100. In the closed position, as shown in FIGS. 20-22, the sealing surface 402, 452 of the valve disc 400, 450 sealingly engages the valve seat 365 to close the pressure relief valve 100. The pressure relief valve 100 remains in the closed position when the spring 700 applies a biasing force that is greater than an opposing force applied by pressure built up within the tank to which the pressure relief valve 100 is coupled. When the force applied by the pressure exceeds a threshold pressure corresponding with the biasing force of the spring 700, the valve disc 400, 450 is pushed axially along the longitudinal axis toward the outlet 120 to disengage the valve seat 365 in an open position and form a gap between the valve disc 400, 450 and the valve seat 365. In turn, fluid is able to flow from the inlet 110, along the flow paths 900, 950, and out through the outlet 120 to discharge the excess pressure within the tank. Once the pressure reduces to a threshold level, the spring 700 pushes the valve disc 400, 450 axially along the longitudinal axis to engage the valve seat 365 and close the pressure relief valve 100. The valve body 200, the valve disc 400, 450, the guide 500, and the retainer 600 are configured to enable the valve disc 400, 450 to consistently form a sealed connection with the valve seat 365 over time.

What is claimed is:

1. A pressure relief valve for a liquid hydrogen tank, the pressure relief valve comprising:

a valve body defining a chamber extending between a first end and a second end;

a seat body coupled to the first end of the valve body and defining a valve seat that extends into and is positioned within the chamber of the valve body;

a valve disc comprising a flange and defining a sealing surface and a through hole, wherein the valve disc is positioned within the chamber of the valve body, wherein the valve disc is configured to engage the valve seat in a closed position and is configured to disengage the valve seat in an open position;

a guide disposed within the chamber and including a first guide end and a second guide end, wherein the first guide end defines a recessed surface that securely receives the flange of the valve disc, wherein the through hole of the valve disc enables a back pressure to keep the flange coupled to the recessed surface when the valve disc is moved to the open position;

a retainer coupled to the guide within the chamber and defining an inner ledge, wherein the flange of the valve disc is secured between the inner ledge and the first guide end;

a cap coupled to the valve body within the chamber adjacent the second end of the valve body; and a spring extending between and engaging the cap and the second guide end to bias the valve disc to engage the valve seat in the closed position.

2. The pressure relief valve of claim 1, wherein outer surfaces of the guide and the retainer and an inner surface of the valve body define flow paths through which fluid flows within the chamber.

3. The pressure relief valve of claim 2, wherein the inner surface of the valve body has a cylindrical shape and the outer surfaces of the guide and the retainer form a substantially polygonal shape to define the flow paths.

4. The pressure relief valve of claim 2, wherein the outer surfaces of the guide and the retainer have rounded portions that engage the inner surface of the valve body.

5. The pressure relief valve of claim 4, wherein, the rounded portions of the guide are spaced apart axially from the rounded portions of the retainer to create multiple contact points axially along a longitudinal axis of the valve body to deter the valve disc from tilting relative to the longitudinal axis within the chamber.

6. The pressure relief valve of claim 1, wherein the guide includes a rib that extends from the recessed surface, wherein the rib grips the flange of the valve disc to facilitate retainment of the valve disc within the recessed surface.

7. The pressure relief valve of claim 1, wherein the guide includes an outer lip that extends circumferentially around the recessed surface, wherein the outer lip engages an outer circumferential surface of the flange to facilitate alignment of the valve disc with the valve seat.

8. The pressure relief valve of claim 1, wherein the cap includes a core and a plurality of arms that extend radially outward from the core, wherein the plurality of arms are circumferentially spaced apart from each other to define openings for fluid flow.

9. The pressure relief valve of claim 8, wherein the plurality of arms of the cap include external threads and the valve body includes internal threads adjacent the second end that threadably couple the cap to the valve body.

10. The pressure relief valve of claim 8, wherein a position of the cap relative to the valve body is adjustable via threads to enable a biasing force of the spring to be adjusted.

11. The pressure relief valve of claim 1, wherein the guide includes an inlet-side portion that defines the recessed surface and external threads, the retainer defines a recessed chamber with internal threads, and the internal threads threadably receive the external threads to couple the retainer to the guide.

12. The pressure relief valve of claim 1, wherein the seat body includes external threads and the valve body includes internal threads adjacent the first end that threadably couple the seat body to the first end of the valve body.

13. The pressure relief valve of claim 1, wherein the recessed surface includes an inner lip that defines an inner chamber, and wherein the valve disc is configured to be adjacent to but not extend into the inner chamber when the valve disc is securely received by the recessed surface such that a gap is formed between the valve disc and an innermost surface of the recessed surface.

14. The pressure relief valve of claim 13, wherein the through hole extends to the inner chamber to enable the back pressure to be created within the gap.

15. A pressure relief valve for a liquid hydrogen tank, the pressure relief valve comprising:

a valve body defining a chamber;

a valve seat positioned within the chamber of the valve body;

a valve disc comprising a flange and defining a sealing surface and a through hole, wherein the valve disc is positioned within the chamber of the valve body, wherein the valve disc is configured to engage the valve seat in a closed position and is configured to disengage the valve seat in an open position;

a guide disposed within the chamber and defining a recessed surface that securely receives the flange of the valve disc, wherein the through hole of the valve disc enables a back pressure to keep the flange coupled to the recessed surface when the valve disc is moved to the open position; and a retainer coupled to the guide within the chamber and defining an inner ledge, wherein the flange of the valve disc is secured between the inner ledge and the guide.

16. The pressure relief valve of claim 15, wherein the recessed surface includes an inner lip that defines an inner chamber, and wherein the valve disc is configured to be adjacent to but not extend into the inner chamber when the valve disc is securely received by the recessed surface such that a gap is formed between the valve disc and an innermost surface of the recessed surface.

17. The pressure relief valve of claim 16, wherein the through hole extends to the inner chamber to enable the back pressure to be created within the gap.

18. The pressure relief valve of claim 15, wherein the guide includes a rib that extends from the recessed surface, wherein the rib grips the flange of the valve disc to facilitate retainment of the valve disc within the recessed surface.

19. The pressure relief valve of claim 18, wherein the rib includes a pointed apex that is configured to dig into the flange of the valve disc.

20. The pressure relief valve of claim 15, wherein the guide includes an outer lip that extends circumferentially around the recessed surface, wherein the outer lip engages an outer circumferential surface of the flange to facilitate alignment of the valve disc with the valve seat.

* * * * *